US007330480B2

United States Patent
Khan et al.

(10) Patent No.: US 7,330,480 B2
(45) Date of Patent: Feb. 12, 2008

(54) ADAPTIVE NETWORK RESOURCE CONTROL

(75) Inventors: Irfan Khan, San Diego, CA (US); Kuo-Chun Lee, San Diego, CA (US); Cherng-Shung Hsu, San Diego, CA (US)

(73) Assignee: Telefonaktiebolaget LM Ericcson (SE)

( * ) Notice: Subject to any disclaimer, the term of this patent is extended or adjusted under 35 U.S.C. 154(b) by 1074 days.

(21) Appl. No.: 10/227,742

(22) Filed: Aug. 26, 2002

(65) Prior Publication Data

US 2004/0037306 A1   Feb. 26, 2004

(51) Int. Cl.
*H04J 3/16* (2006.01)
*H04J 1/16* (2006.01)
*H04J 3/14* (2006.01)
*H04L 12/28* (2006.01)

(52) U.S. Cl. ............... 370/437; 370/229; 370/351; 370/395.72; 370/400

(58) Field of Classification Search .......... None
See application file for complete search history.

(56) References Cited

U.S. PATENT DOCUMENTS

| 5,229,993 | A | * | 7/1993 | Foudriat et al. ........... 370/445 |
| 5,548,735 | A | * | 8/1996 | Chen et al. ................... 710/7 |
| 5,553,073 | A | * | 9/1996 | Barraclough et al. ........ 370/455 |
| 5,596,576 | A | * | 1/1997 | Milito ........................ 370/450 |
| 6,041,354 | A | * | 3/2000 | Biliris et al. ................ 709/226 |
| 6,118,791 | A | * | 9/2000 | Fichou et al. ............... 370/468 |
| 6,882,642 | B1 | * | 4/2005 | Kejriwal et al. ............ 370/388 |
| 7,107,606 | B2 | * | 9/2006 | Lee .............................. 725/87 |
| 2001/0043613 | A1 | * | 11/2001 | Wibowo et al. ............ 370/468 |

* cited by examiner

*Primary Examiner*—Edan Orgad
*Assistant Examiner*—Blanche Wong
(74) *Attorney, Agent, or Firm*—Coats & Bennett, P.L.L.C.

(57) ABSTRACT

An admissions control technique improves processing capacity utilization in a token-based admission control scheme by matching token allocation to actual processing requirements. In an exemplary application, the processing capacity of a processing entity is discretely represented by a plurality of tokens. Work is admitted to the processing entity through a plurality of processing event entry points. Each of these entry points is initially allocated a share of the tokens. During each one of a succession of admission cycles, events are admitted at each entry point until that entry point's share of the tokens is exhausted. At the end of each cycle, tokens are re-allocated to the entry points for use during the next admission cycle based on the actual usage of tokens during the current cycle. An entry point's token allocation may be increased for the next cycle by re-allocating leftover tokens from other, less busy entry points.

46 Claims, 9 Drawing Sheets

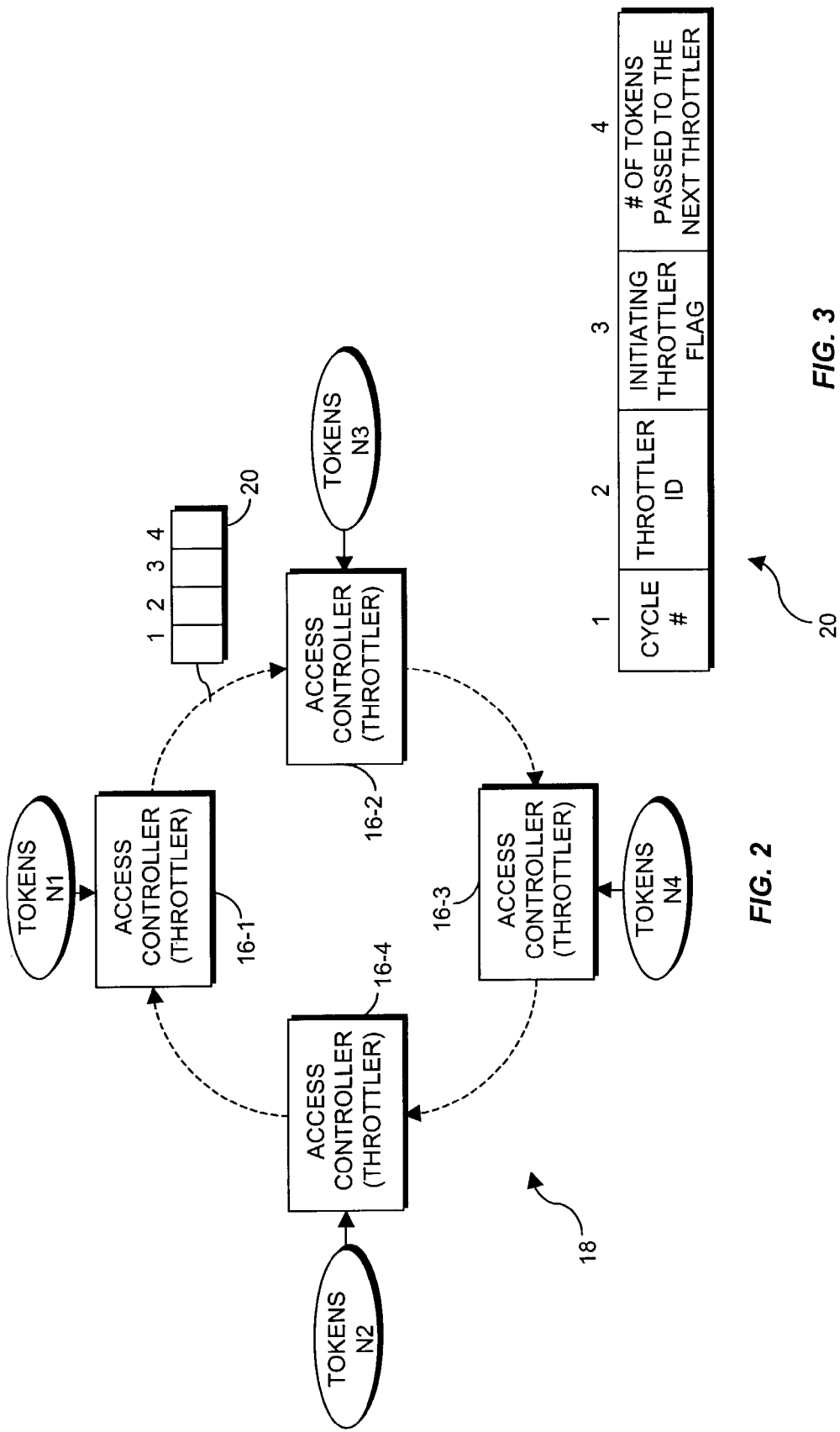

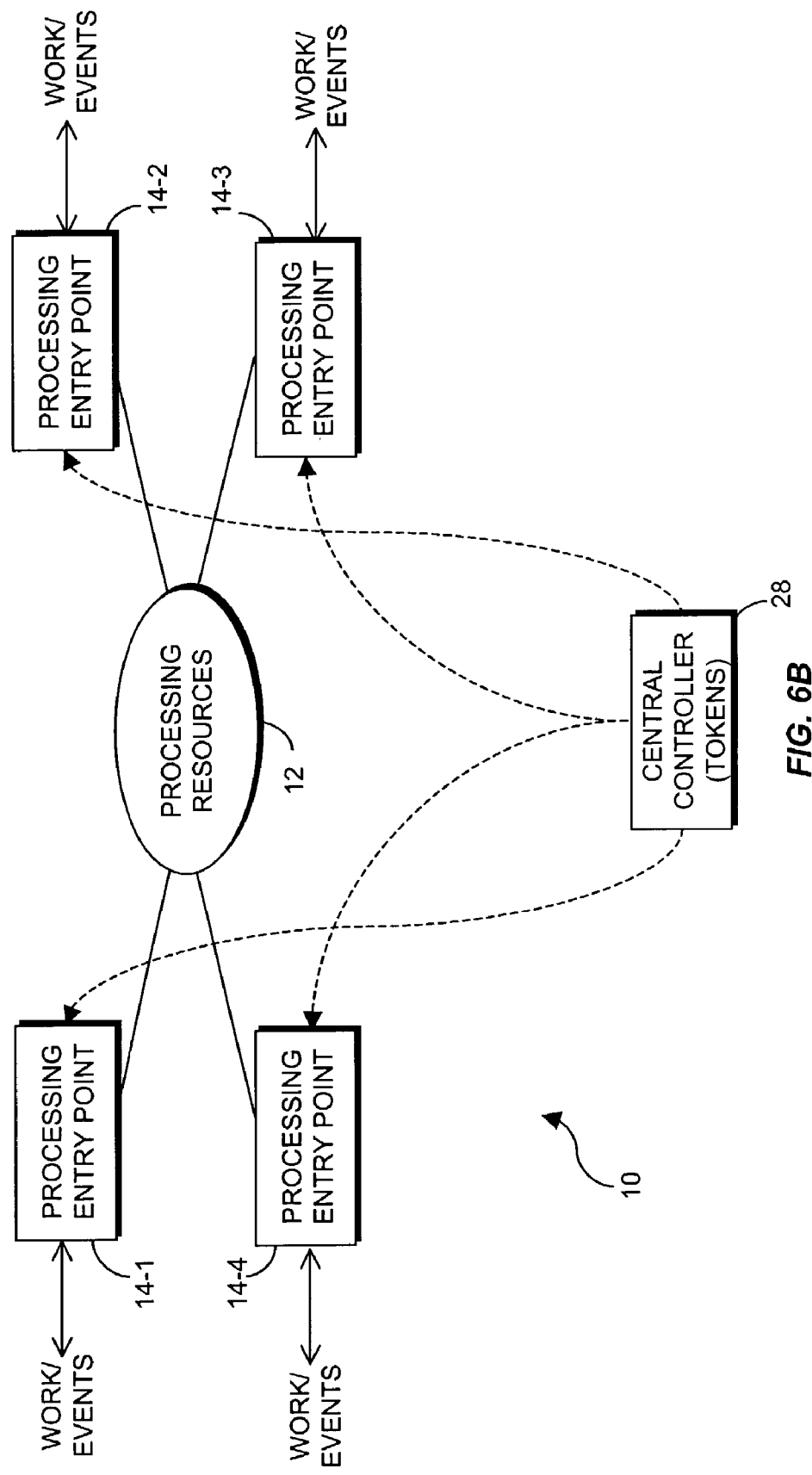

ADAPTIVE NETWORK RESOURCE CONTROL

BACKGROUND OF THE INVENTION

The present invention generally relates to processing resource control such as in a wireless communication network, and particularly relates to improved token-based admissions control.

Processing systems have finite processing capability, and a given system accommodates only a limited number of tasks or events at any given moment. Systems in which processing demand may outstrip processing capability oftentimes use some form of resource control to more effectively allocate various processing resources to the active and pending processing tasks. Such resource control schemes find use in a variety of processing environments, such as in wireless communication networks where call processing loads must be carefully managed to ensure sufficient reserve processing overhead for ongoing system operations.

A given entity in a wireless communication network, such as a Base Station System (BSS), manages call traffic and associated processing overhead for mobile-originated and mobile-terminated calls. Depending on the type of network involved, the BSS may have many "entry points" through which it receives processing events, such as call-related signaling messages. In the BSS context, an entry point roughly corresponds to one of the BSS's defined interfaces. Thus, the typical BSS in a mixed circuit and packet switched network would have entry points corresponding to its interfaces with a supporting Mobile Switching Center (MSC), and with an associated Packet Data Serving Node (PDSN). Similarly, the interface between the BSS and its supported mobile stations represents another entry point. As each event incoming to the BSS consumes some given fraction of the BSS's overall processing resources, the BSS must manage the admission of incoming events at its various entry points to avoid becoming overloaded.

In one form of admission control, processing capacity is "tokenized." In this approach, the processing capacity of a given network entity, such as a BSS, is represented by a defined number of tokens. For example, 1,000 "tokens" might collectively represent the total processing capability of the entity. Note that in a common approach, the total number of tokens defined represents something less than the actual total processing capacity of the entity so that even when all tokens are used, some reserve processing capacity exists for carrying on necessary supporting operations. In any case, each entry point is allocated some fixed number of the total number of tokens for use in controlling the admission of events through that entry point.

As events are admitted through each entry point, the number of tokens available for events entering through that point is reduced. That is, each event admitted through the entry point consumes one or more of the tokens allocated to that entry point. When a given entry point has exhausted its fixed allocation of tokens, that entry point may be "throttled," meaning that it blocks the admission of new events until a sufficient number of its previously used tokens are released for re-use. Allocated tokens are de-allocated according to a variety of schemes, but tokens generally are returned for re-allocation as their corresponding events are processed by or passed through the entity.

One potential shortcoming of maintaining a fixed allocation of tokens at the entry points is that relative activity of the entry points during actual operation may deviate from the assumptions underlying the fixed allocations. Thus, the fixed token allocations often do not match dynamically changing entry point activity. For example, a temporarily "over active" entry point might exhaust its fixed allocation of tokens, while other less active entry points still have tokens leftover. This mismatch in token allocations leads to inefficiency because the entry point that exhausted its token allocation blocks event admissions even though unused tokens remain at the other entry points. In other words, events are blocked at the usually active point not because the entity is actually running at full load but rather because that entry point was allocated too few tokens relative to the other entry points.

In a conventional approach to tokenized processing control within communication networks, token allocations for the various entry points to a given call processing entity are fixed based on one or more traffic models. As such, the relative token allocations between the entry points are appropriate only to the extent that actual call activity matches the assumed traffic models. If the call traffic deviates from the predicted models, even temporarily, one or more entry points may become much busier than predicted. These unexpectedly busy entry points may exhaust their fixed assignment of tokens, leaving the entity underutilized despite the availability of tokens at one or more of its other entry points.

The potential for dynamic traffic conditions to deviate from the generally expected characteristics increases with the increasing diversity of wireless communication service. As new services become available, such as streaming media, and concurrent voice and data connections, the use of fixed token allocation schemes for admission control within a given type of network equipment becomes increasingly inefficient.

BRIEF SUMMARY OF THE INVENTION

The present invention comprises a system and method for efficiently managing processing capacity that is discretely represented by a fixed number of symbolic tokens by matching token allocations to actual processing needs. In an exemplary embodiment, a processing entity, such as a call processing entity in a wireless communication network, includes multiple processing entry points through which processing events are admitted to the entity for processing. As some amount of processing capacity is consumed with each event, admissions control is used to control event entry through the entry points. The token allocations used to limit the entry of events through each entry point dynamically adjust to reflect the relative activities of the entry points. In this manner, token allocations between the various entry points adjust to actual entry point needs rather than remaining at some fixed token allocations.

One exemplary embodiment adopts a distributed token management scheme, wherein M "throttlers" are arranged in a logical communication ring with each throttler preferably controlling event entry at one of the processing entity's access points, although a given throttler may be configured to control admissions through more than one entry point. For example, if the processing entity includes three event entry points, there may be a total of three (M=3) throttlers, one for each entry point. An initial allocation of the N tokens between the three throttlers may be arbitrary, such as the allocation of N/M tokens to each of the throttlers.

In operation, the throttlers perform admissions control based on assigning tokens to admitted events until a given throttler exhausts its allocation of tokens. Periodically, the throttlers exchange token usage information such that "leftover" or unused tokens may be transferred from a relatively inactive throttler to a relatively active throttler. This token information exchange ensures that the allocation of tokens between the throttlers dynamically adjusts to reflect actual conditions. The throttlers may be arranged in a logical ring fashion such that token information passes successively around the ring between the throttlers. When implementing such ring-based exchanges, leftover tokens may tend to accumulate at the throttler occupying the initial position in the ring. Thus, in at least one embodiment, the designated "initiating" throttler changes with each throttle information exchange cycle.

In another exemplary embodiment, token information is managed centrally. In this embodiment, M throttlers control event admission at M entry points. A central controller, which may be a software process running within the entity, manages a common pool of tokens for use by the throttlers. After an initial allocation of tokens to the throttlers, the controller cyclically updates per-throttler token allocation based on the relative needs of each throttler. Preferably, each throttler reports its token usage for the current cycle to the centralized controller, and the controller adjusts token allocations for the next cycle based on this reported usage. Thus, a throttler with leftover tokens may be allocated a reduced number of tokens for admissions control during the next cycle, while a throttler that exhausts its tokens during the current cycle may be allocated an increased number of tokens for the next cycle. However, the central controller maintains the overall number of tokens available for allocation across the various entry points as a fixed number, reflecting the need to limit overall event processing to the desired upper limit on processing load.

While the present invention offers particular advantages regarding admissions control within wireless communication network processing entities, such as BSSs, its dynamic adjustment of token allocations between multiple points of event or work entry within a processing system offers more efficient tokenized processing load control in a wide range of applications. Therefore, those skilled in the art should appreciate that dynamic token allocation may be applied to essentially any processing environment where processing resources must be efficiently allocated.

BRIEF DESCRIPTION OF THE DRAWINGS

FIG. 2 is a diagram for an exemplary token ring arrangement of access controllers (throttlers) used in managing processor loading.

FIG. 3 is a diagram of an exemplary token usage information message used to share token usage information within the token ring of FIG. 2.

FIGS. 6A and 6B are exemplary diagrams of centralized token allocation management.

DETAILED DESCRIPTION OF THE INVENTION

While the following discussion and diagrams present exemplary details for various processing environments in which the present invention may be practiced, those skilled in the art should appreciate that the present invention is broadly applicable to controlling processor loading in a range of computing environments. Thus, the present invention may be applied to a single microprocessor, a cluster of microprocessors, across associated processing systems, such as within or across processing cards in a telecommunications rack. Indeed, the present invention presents an adaptive, token-based approach to controlling the processing load placed on essentially any type of computing resource. Of course, one or more exemplary embodiments of the present invention may have particular advantages in certain environments, such as within one or more type of wireless communication network entities in which call-related processing loads must be managed to ensure efficient usage of available call processing resources while avoiding overloading those resources.

Figure 1:
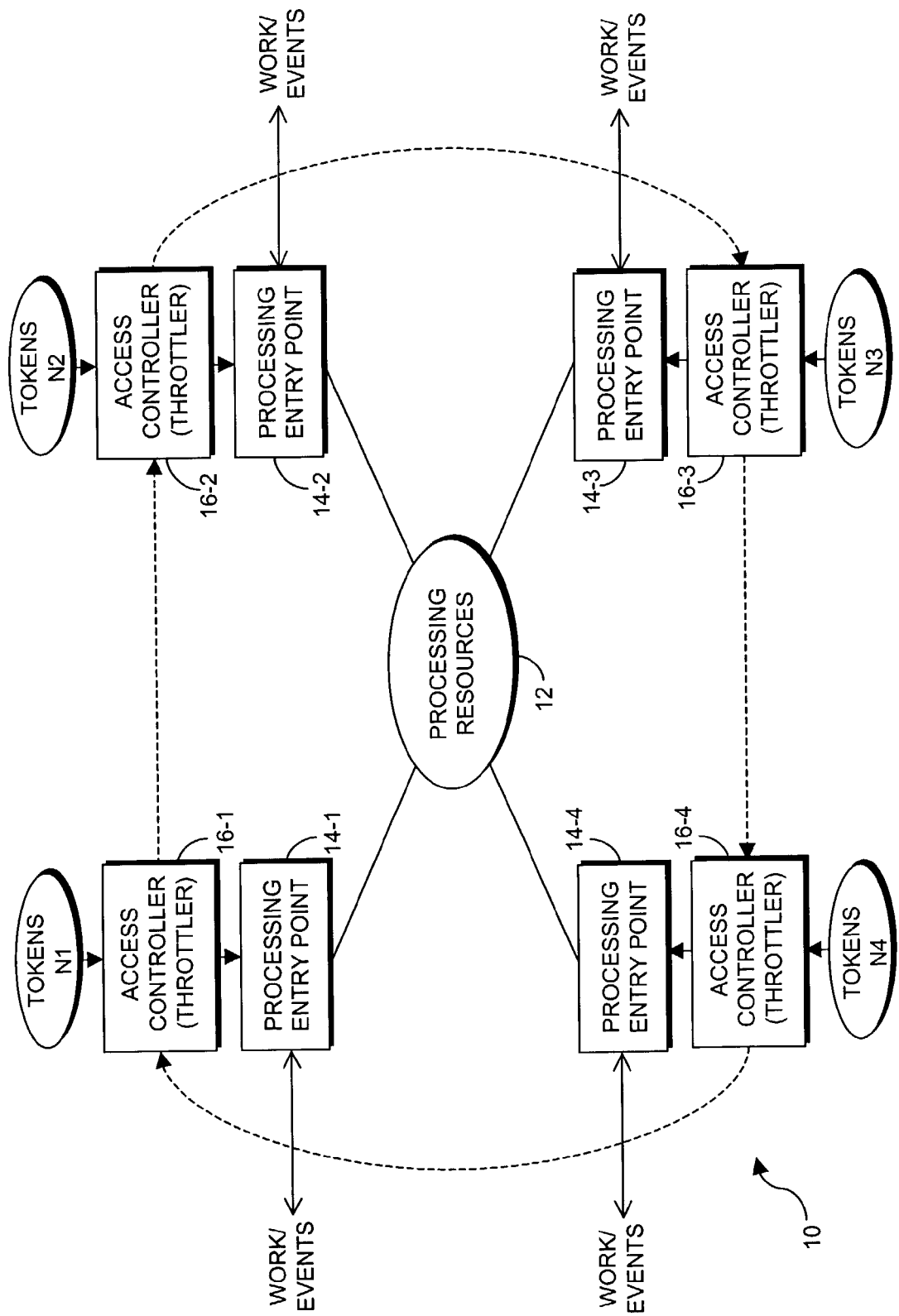
FIG. 1 is a diagram of an exemplary processing entity for practicing the present invention.

With the above comments in mind, the discussion turns to FIG. 1, which is a diagram of an exemplary processing entity generally referred to by the numeral 10, and in which one or more embodiments of the present invention may be advantageously practiced. Processing entity 10 comprises processing resources 12, a plurality of processing entry points (PEPs) 14, and a plurality of access controllers (ACs) 16. In an exemplary embodiment, respective ones of the access controllers 16, also referred to as "throttlers" herein, are paired with individual entry points 14 and limit the number of processing events admitted to the processing resources 12 to avoid overloading the resources.

More specifically, the total processing or "work" capacity of processing resources represented by a defined number of tokens, such that each token symbolizes a quantum of the overall work capacity of the processing resources 12. Here, a total of "N" tokens are defined, with a sub-set Ni of that total number of tokens assigned to the ith one of the entry points 14. Thus, entry point 14-1 is allocated N1 tokens, entry point 14-2 is allocated N2 tokens, and so on. With this approach, N1+N2+N3+N4=N, meaning that the total allocation of tokens across the entry points 14-1, 14-2, 14-3, and 14-4, is limited by the fixed number N of total tokens.

Each processing event represents one or more units of "work," which means that each processing event admitted to processing resources 12 through one of the entry points 14 consumes one or more of the tokens allocated to that entry point 14. For example, assuming that each event equates to one token, N1 events can be admitted through entry point 14-1, N2 events can be admitted through entry point 14-2, and so on. Once an entry point 14 runs out of tokens (exhausts its token allocation), the corresponding one of the access controllers 16 throttles that entry point 14 such that the admission of new events to processing resources 12 through that entry point 14 are blocked or otherwise deferred.

In an exemplary embodiment of the present invention, the individual token allocations for the entry points 14 are dynamically adjusted such that the token allocations adapt to actual token usage across the entry points 14. In general terms, the approach is to increase the token allocation for an entry point 14 that is relatively busy compared to one or more of the other entry points 14, and to decrease the token allocation for an entry point 14 that is relatively less busy than one or more of the other entry points 14. Such token allocation adjustments include consideration of actual token usage at each one of the entry points 14 such that a less busy entry point 14 may contribute tokens to a relatively busier entry point 14. Thus, busy entry points 14 "borrow" tokens from less busy entry points 14, such that token allocations may be increased at one or more of the entry points 14 while maintaining the fixed total of N tokens available for admission control.

Token usage information sharing or reporting enables dynamic token allocation adjustments between the various entry points 14. Determining token allocation adjustments in light of relative token usage at the various entry points 14 generally requires that the entry points 14 pass along token usage information to each other and/or requires a centralized processing point which has access to usage data from each of the entry points 14. In either generalized approach, token allocation adjustments at one entry point 14 are made in consideration of token usage at one or more of the other entry points 14.

FIG. 2 illustrates an exemplary embodiment wherein token usage information at the various entry points 14 is shared based on logically structuring the access controllers 16 in a "token ring" 18. For simplicity, only the access controllers 16 are shown in the token ring 18, but it should be understood that each of the entry points 14 still is associated with a corresponding one of the access controllers 16. Token usage information is shared between the access controllers 16 in the token ring 18 based on the controllers 16 passing a token usage information message 20 around the ring 18. That is, in an exemplary arrangement, controller 16-1 updates message 20 with its token usage information and passes the message to controller 16-2, which updates it and passes it along to controller 16-3, and so on.

FIG. 3 illustrates an exemplary embodiment of message 20, which here includes the following fields:
FIELD1: CYCLE#
FIELD2: THROTTLER ID
FIELD3: INITIATING THROTTLER FLAG
FIELD4: # OF TOKENS PASSED TO THE NEXT THROTTLER FIELD1 is set by the initiating access controller 16 in each cycle and may be used to track cycle count in any desired fashion. FIELD2 is set in turn by each one of the access controllers 16 as it passes message 20 along to the next access controller 16 in the token ring 18. FIELD3 is set only by the initiating access controller 16, and used to indicate to the next access controller 16 in the token ring 18 that it should assume the role of initiating throttler. FIELD4 is used to pass token usage information between the access controllers 16 in the token ring 18.

Figure 4:
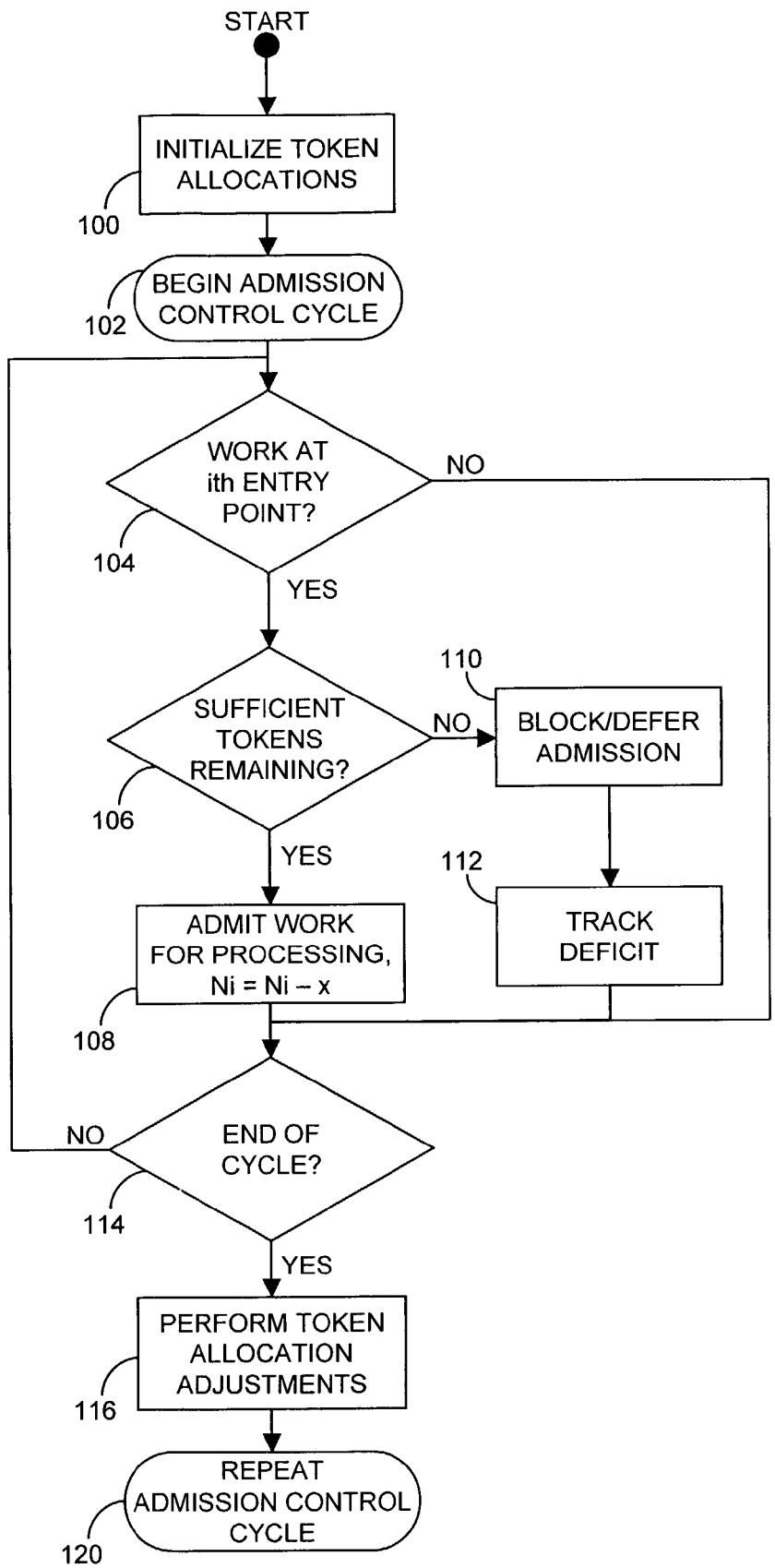
FIG. 4 is an exemplary logic flow diagram illustrating token allocation operations associated with processor load control.
Figure 5:
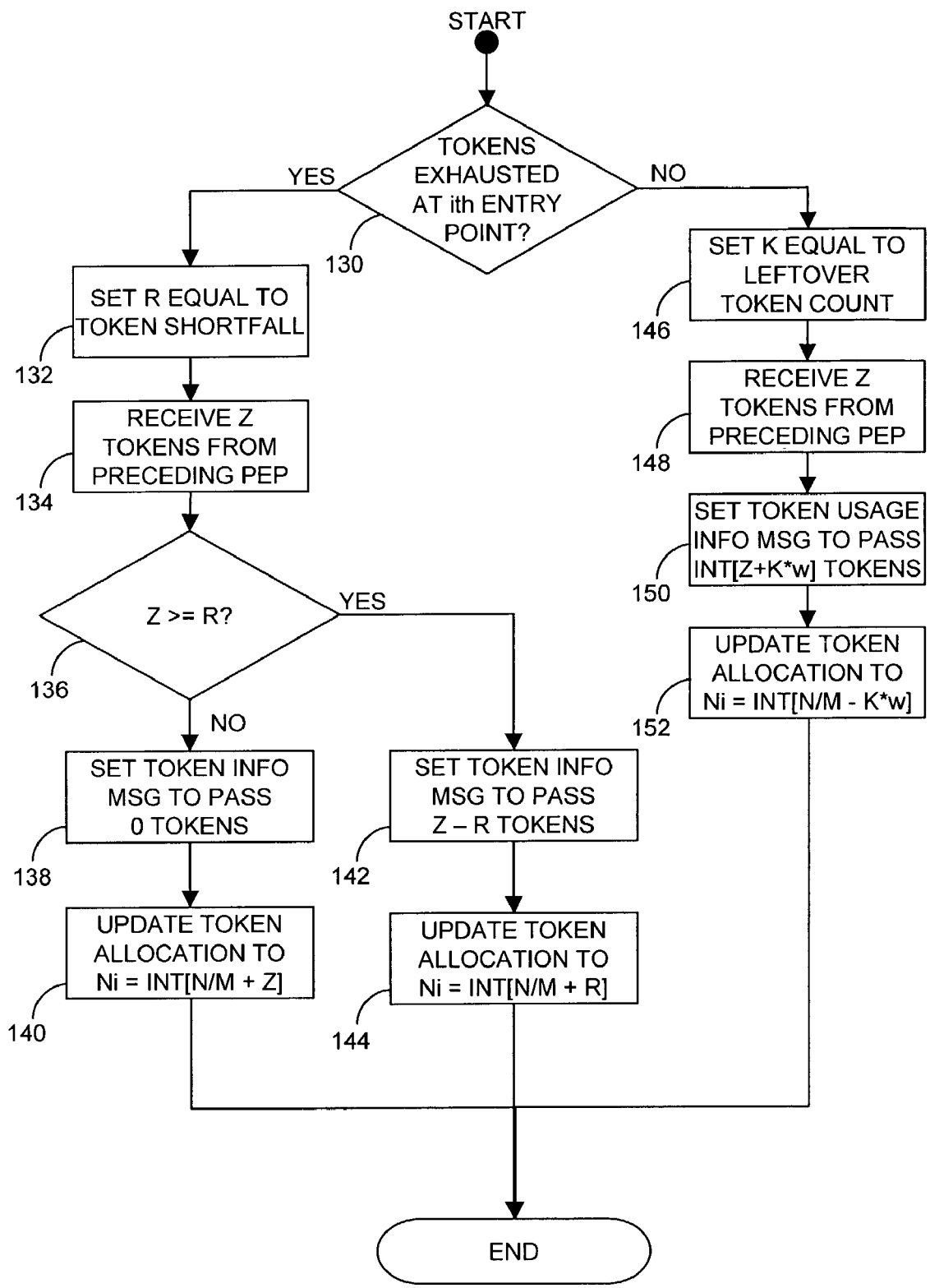
FIG. 5 is an exemplary logic flow diagram illustrating details for one embodiment of dynamic token allocation adjustment.

To better understand the use of these exemplary fields and the meaning of "initiating throttler," FIGS. 4 and 5 illustrate exemplary flow logic for dynamic token adjustment operations in the context of token ring 18. In FIG. 4, operations begin with the processing entity 10 initializing the token allocations for each of the entry points 14 (Step 100). An exemplary approach simply divides the total of N tokens between each of the entry points 14. Thus, where there are M entry points 14, each one of the entry points 14 is initially allocated N/M tokens. With this approach, $N1=N2=N3=N4=\frac{1}{4}N$, meaning that each of the entry points 14 is initially allocated 25% of the total N tokens defined in processing entity 10. Of course, the initial token allocations may be divided in non-equal amounts based on anticipated differences in activity between the various entry points.

Regardless, processing entity 10 defines a repeating "admission cycle" of T seconds. In operation, the ith entry point admits at most Ni units of work, which equates to at most Ni processing events depending upon the complexity of the events, i.e., work unit equivalent of each processing event. At the end of each admission cycle, the ith entry point 14 is re-allocated Ni tokens for admission control during the next admission cycle. The present invention operates to dynamically adjust the value of Ni for the ith entry point 14 such that the value of Ni for the next admission cycle increases if the ith entry point 14 exhausted its allocation of tokens during the previous admission cycle, assuming that one or more of the other entry points 14 have leftover tokens available.

At the beginning of each admission cycle (Step 102), the ith entry point 14 determines if a processing event has been presented to it for processing by processing resources 12 (Step 104). If so, the ith admission controller 16 determines whether a sufficient number of tokens are available for admitting the processing event (Step 106). The ith admission controller 16 may make such a determination based on, for example, equating the processing event type with a defined number of work units, such that it determines whether the pending event will consume one, two, or more tokens. Event types may be pre-mapped to their work unit equivalents for quick determination of the token value of incoming processing events.

In any case, if a sufficient number of tokens are available for admitting the pending event, the ith access controller 16 permits entry of the event for processing by processing resources 12 and decreases the available token count accordingly. In one approach, a working copy of the value of Ni is simply reduced by "x" with the admission of each processing event, where x equals the number of tokens consumed by the admitted processing event. Thus, a running count of remaining tokens at the ith entry point 14 is maintained over each admission cycle.

If sufficient tokens are not available for admitting a pending event (Step 106), the ith access controller 16 blocks admission of that event (Step 110), tracks the token deficit (Step 112), and processing continues. Tracking the token deficit permits the ith access controller 16 to determine the cumulative shortfall of tokens during the current admission cycle. Thus, if the ith access controller begins a given admission cycle with Ni tokens and the ith entry point 14 is presented with a number of processing events equivalent to Ni+R tokens during the jth admission cycle, the number R represents the shortfall or the amount by which the allocation of Ni tokens fell short of actual need.

If the jth admission cycle has not ended (Step 114), event admission control proceeds as described. However, if the admission cycle has ended, processing entity 10 performs token allocation adjustments in advance of the next cycle (Step 116), such that the distribution of the N tokens among the M entry points 14 reflects the relative needs of those entry points. Once the token allocation adjustments are completed, the next admission cycle begins anew (Step 120).

FIG. 5 illustrates exemplary details for the dynamic token allocation adjustments discussed in Step 116 of FIG. 4. Processing begins for the ith entry point 14 (Step 130) with the determination of whether its allocation of Ni tokens was exhausted during the current admission cycle. If so, the ith entry point 14 sets a variable "R" equal to the token shortfall (Step 132). The ith access controller 16, as part of token ring 18, receives token usage information message 20 from the preceding access controller 16 in the token ring 18. Message 20 includes FIELD4, which is set to a value Z by the preceding access controller 16, where Z indicates the number of leftover tokens being passed along token ring 18 to the ith access controller 16. Thus, the ith access controller 16 receives Z tokens from the preceding access controller 16 (Step 134).

If Z is greater than or equal to the token shortfall R (Step 136), then the ith access controller 16 receives more leftover tokens than needed by amount given as Z−R. In this case, the ith access controller 16 "keeps" R tokens for its own use during the next admission cycle, and passes along Z−R tokens to the next access controller 16 in the token ring 18 (Steps 142 and 144). The ith access controller 16 sends along the Z−R tokens to the next access controller 16 by relaying message 20 with the appropriate field updates. With its retention of R leftover tokens, the ith access controller 16 updates its token allocation value Ni for the next admission cycle.

In an exemplary embodiment, Ni equals INT[N/M+R], wherein "INT" represents the greatest integer function, N equals the fixed total of tokens available in the system, and M equals the number of entry points 14. Thus, Ni is "reset" for the next admission cycle to its default value of N/M plus R extra tokens. Of course, the reset value of Ni may be referenced to something other than a simple equitable division of N. Regardless, the value of Ni is dynamically increased by R on the assumption that the previous cycle's shortfall indicates that a greater allocation of tokens is appropriate for the upcoming cycle. Note that the token allocation is increased only if leftover tokens are available from other entry points 14 to avoid violating the upper limit of N tokens.

If Z is less than R (Step 136), then the ith access controller 16 has received fewer leftover tokens that it needs—indeed, Z may equal zero. Therefore, the ith access controller updates FIELD4 of message 20 to indicate that it is passing zero leftover tokens to the next access controller 16 in token ring 18 (Step 138). The ith access controller 16 then updates its token allocation Ni for the next admission cycle as Ni=INT[N/M+Z] (Step 140). As noted, Z is less than the shortfall R and may be zero.

If the ith entry point 14 did not exhaust its allocation of Ni tokens during the current admission cycle (Step 130), the ith access controller 16 sets K to the count of leftover tokens (Step 146). Such leftover tokens are then available for transfer to other, more needy entry points 14. In general, the value of K equals the current token allocation count Ni minus the number of tokens actually used during the current admission cycle. Thus, where the ith access controller 16 receives Z tokens from the previous access controller 16 in the token ring 18 (Step 148), it has Z+K leftover tokens to pass along token ring 18.

Note that the ith access controller 16 may "hold back" some number of its K leftover tokens such that it begins the next admission cycle with a small reserve of potentially excess tokens. Therefore, the ith access controller 16 may transfer Z+K*w leftover tokens, where "w" is some fractional modifier such as 70% or 80%. Thus, the ith access controller 16 updates message 20 such that INT[Z+K*w] tokens are passed along the token ring 18 to the next access controller 16 (Step 150). The ith access controller 16 then updates its token allocation Ni for the next admission cycle such that Ni=INT[N/M−K*w], reflecting the fact that it passed along K*w of its previous allocation of tokens for use at other entry points 14 (Step 152).

In following the above discussion, one might have noted that the number of leftover tokens tends to increase as message 20 is relayed around the token ring 18. This tendency results in a potential unfairness because, in a given admission cycle, message 20 originates from a given one of the access controllers 16, and passes in succession around the token ring 18 until it returns to the originating one of the access controllers 16, where it is terminated to avoid recirculation.

To avoid this potential unfairness, the originating access controller 16 changes with each admission cycle. In an exemplary embodiment, the originating access controller designation advances by one position in the token ring 18 with each admission cycle. Message 20 facilitates dynamically changing the originating designation. In support of this function, message 20 includes the initiating throttler flag (FIELD3), which serves as a circulating "relay flag" used to shift the initiating throttler flag around token ring 18.

For example, the following scenario illustrates exemplary operations related to manipulating and relaying message 20 around token ring 18. Note that access controllers 16-1 through 16-4 are designated as THROTTLER1 through THROTTLER4 for convenience. In one scenario, THROTTLER1 begins operation as the initiating throttler at the initial admission cycle. It passes message 20 to THROTTLER2 with FIELD2 set to the ID value of THROTTLER1, FIELD4 set to its leftover token count, FIELD3 cleared, and FIELD1 set to the current cycle count value, CYCLE1. Each throttler (access controller 16) remembers the current cycle count value included in message 20.

THROTTLER2 receives message 20, sets FIELD2 to the ID value for THROTTLER2, updates the leftover token count in FIELD4 based on whether it needs tokens or has leftover tokens available, and then passes message 20 along to THROTTLER3. THROTTLER3 updates message 20 accordingly, and passes it along to THROTTLER4, which updates message 20 in like fashion. THROTTLER4 then passes message 20 back to THROTTLER 1.

THROTTLER1 sees that the cycle count in FIELD1 matches its stored cycle count value, which indicates that message 20 has completed its circuit around the token ring 18. Thus, THROTTLER1 designates THROTTLER2 as the next initiating throttler by setting the initiating throttler flag of FIELD3 in message 20, and increments the cycle count value in FIELD1 by one. Note that only the initiating throttler is permitted to set/clear the flag of FIELD3 and update the cycle count value of FIELD1. THROTTLER1 clears FIELD4, keeping the Z accumulated tokens, updates FIELD2 to its ID value and passes message 20 along to THROTTLER2.

Upon receipt of message 20, THROTTLER2 sees that the initiating throttler flag of FIELD3 is set and, in response, it assumes the role of initiating throttler. Thus, it clears FIELD3, updates FIELD2 with its ID value and updates the leftover token value Z in FIELD4 as needed, and then passes message 20 along token ring 18. Once, message 20 completes the circuit and returns to THROTTLER2, it updates FIELD2 to its ID value, keeps any accumulated tokens and clears the leftover token count Z of FIELD4, increments the cycle count of FIELD1, sets the initiating throttler flag of FIELD3, and passes message 20 along to THROTTLER3.

Thus, the initiating throttler designation travels from THROTTLER1 to THROTTLER2, and so on around the token ring 18.

Note that in an exemplary variation of the above token ring approach, cycles might be managed such that the previous cycle's initiating throttler starts the current admission cycle. For example, assume that THROTTLER2 was the initiating throttler for the previous cycle, designated here as CYCLE2. At the beginning of the next cycle, CYCLE3, THROTTLER2 clears FIELD4, keeping any leftover tokens, sets FIELD2 to its ID value, sets the initiating throttler flag of FIELD3, and then sends the message 20 to THROTTLER3. Upon receiving message 20, THROTTLER3 assumes the role of initiating throttler for CYCLE3, clears FIELD3, updates the cycle number in FIELD1 and the throttler ID in FIELD2, and then begins the cycle by passing message 20 along to the next access controller 16 in the token ring 18. Message 20 is then passed along the ring 18 back to THROTTLER3, which terminates circulation of message 20 for CYCLE3 based on recognizing that the current cycle count matches the value previously set by it.

Figure 6A:
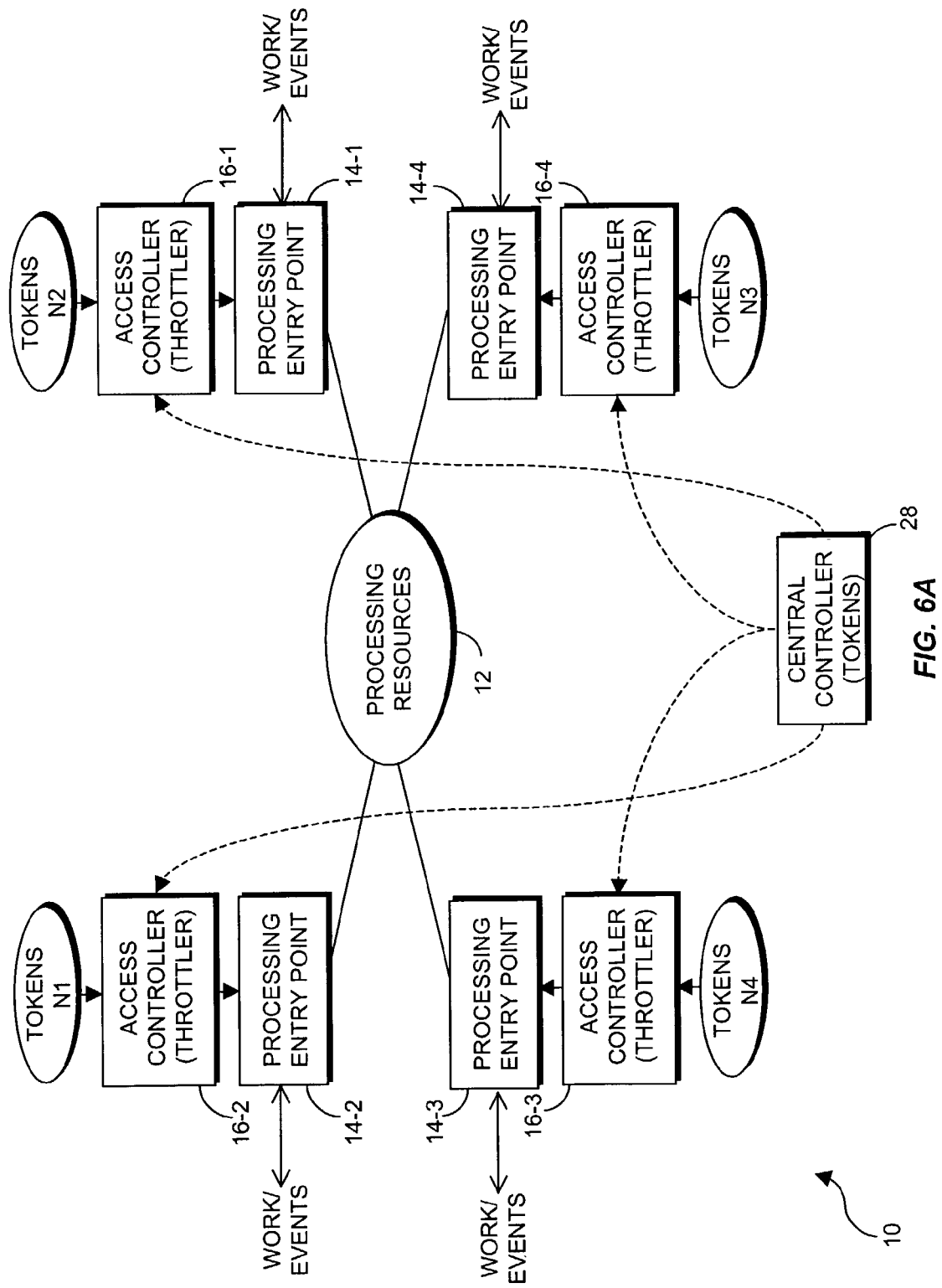

FIG. 6A illustrates an exemplary embodiment of centralized token management, which stands as an alternative to the token ring arrangement just discussed. With centralized token management, token usage information is not passed in succession from one throttler to the next but rather all throttlers (access controllers 16) report token usage information to a centralized controller 28. The centralized controller 28 evaluates the token usage during each admission cycle for each of the access controllers 16.

In this manner, the centralized controller 28 can increase or decrease the allocation of tokens for use at each entry point 14 based on each entry point's relative need, while still observing the upper limit of N total tokens. Thus, if a first one of the access controllers 16 reports leftover tokens while a second one reports a token shortfall, the centralized controller 28 might reduce the token allocation at the first one and increase the token allocation at the second one.

FIG. 6B illustrates an alternate exemplary embodiment for centralized token management, and further illustrates the flexibility of functionally arranging or defining the elements supporting dynamic token management according to the present invention. Thus, the central controller 28 might communicate with and directly control the processing entry points 14 without benefit of an explicit arrangement of access controllers 16. More generally, those skilled in the art should appreciate that the various figures discussed herein depict functional arrangements without limiting the actual physical and logical implementations of the present invention. As such, it should be understood that the one or more of the central controller 28, the access controllers 16, and the processing entry points 14 may be implemented in essentially any arrangement, including as logical elements in one or more software processes supported by the processing resources 12.

Figure 7:
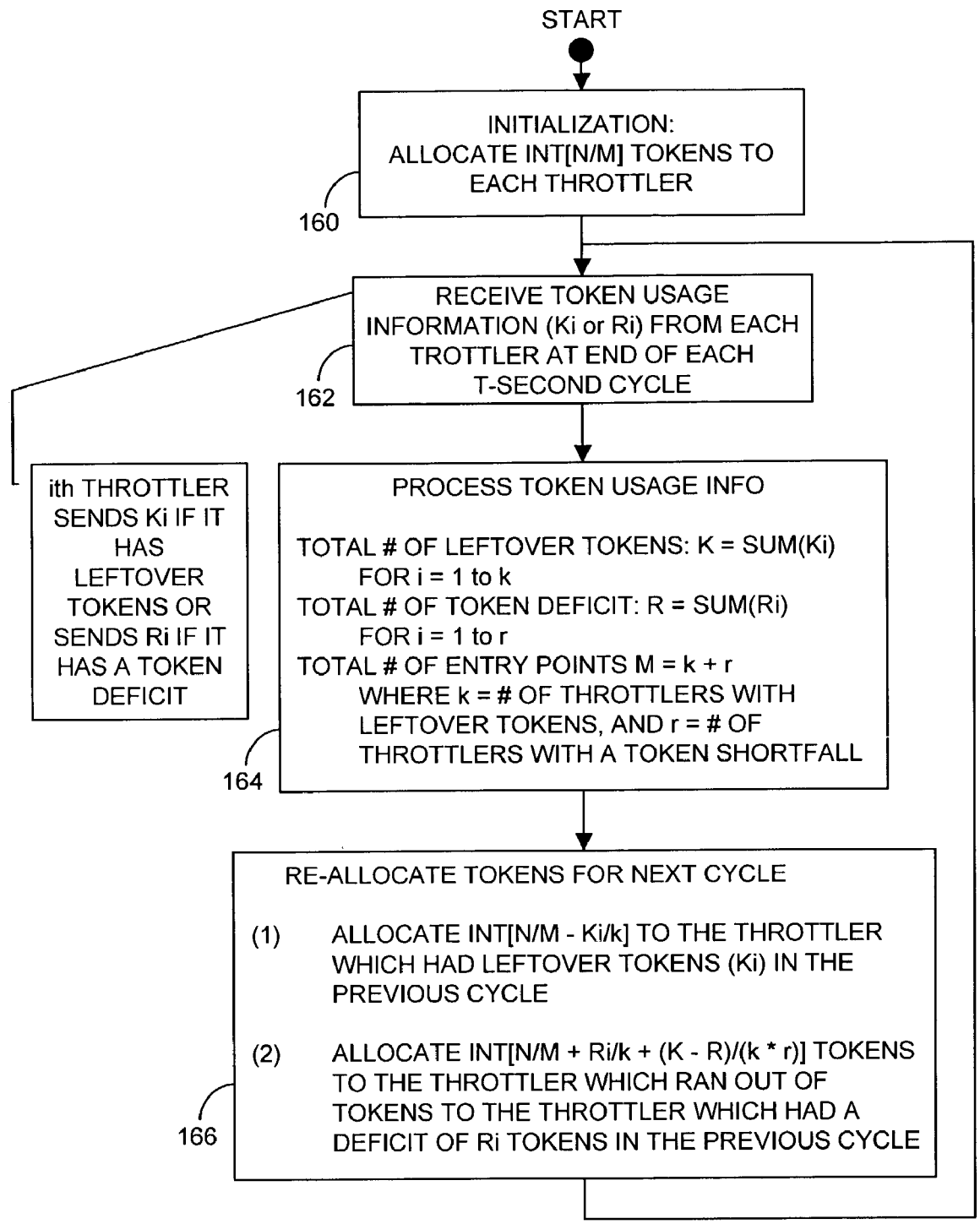
FIG. 7 is an exemplary logic flow diagram illustrating processing details supporting centralized token allocation adjustment.

Regardless of the physical implementation details, FIG. 7 illustrates exemplary flow logic for centralized token management in contrast to the distributed approach described immediately above. Processing begins with the centralized controller 28 initializing the token allocations for access controller 16-1 through 16-4 to allocation values N1 through N4, where the value of each Ni equals N/M, or some other desired fraction of the total token count N (Step 160). At the end of each admission cycle, the centralized controller 28 receives token usage information for the cycle from each of the access controllers 16 (Step 162). Token usage information may be sent from each of the access controllers 16 as a value Ki or Ri, indicating the count of leftover tokens or the token shortfall, respectively, for the current admission cycle.

Upon receipt of token usage information from all access controllers 16, the centralized controller 28 determines the total number of leftover tokens as $$K = \sum_{i=1}^{k} Ki,$$

where k=the number of access controllers 16 reporting leftover tokens (Step 164).

Similarly, the centralized controller 28 determines the total shortfall of tokens as $$R = \sum_{i=1}^{r} Ri,$$

where r=the number of access controllers 16 reporting a token shortfall (Step 164). Note that the total number M of access controllers 16 is therefore equal to k+r.

With the computed total leftover and total shortfall information computed, the centralized controller 28 dynamically adjusts the token re-allocations for each of the access controllers 16. In an exemplary embodiment, the centralized controller 28 updates the token allocation Ni for the ith access controller as Ni=INT[N/M−Ki/k] if the ith access controller 16 reported Ki leftover tokens, and as Ni=INT[N/M+Ri/k+(K−R)/(k*r)] if the ith access controller 16 reported a token shortfall of Ri.

One sees that this exemplary approach decreases Ni by an amount proportional to the number Ki of leftover tokens, or increases Ni by an amount proportional to the shortfall of tokens Ri, subject to the overall limitation of N tokens in total. That is, the term (K−R)/(k*r) is negative if more access controllers 16 report token shortfalls than report leftover tokens (R>K), and is positive otherwise. Thus, Ni for the ith access controller 16 might increase by less than the value of Ri/k if R is greater than K. Regardless of these exemplary implementation details, one sees that the centralized controller 28 receives token usage information as reported from each of the access controllers 16, and makes corresponding token allocation adjustments to better match the token allocations used for the next admission cycle to the actual processing needs.

Figure 8:
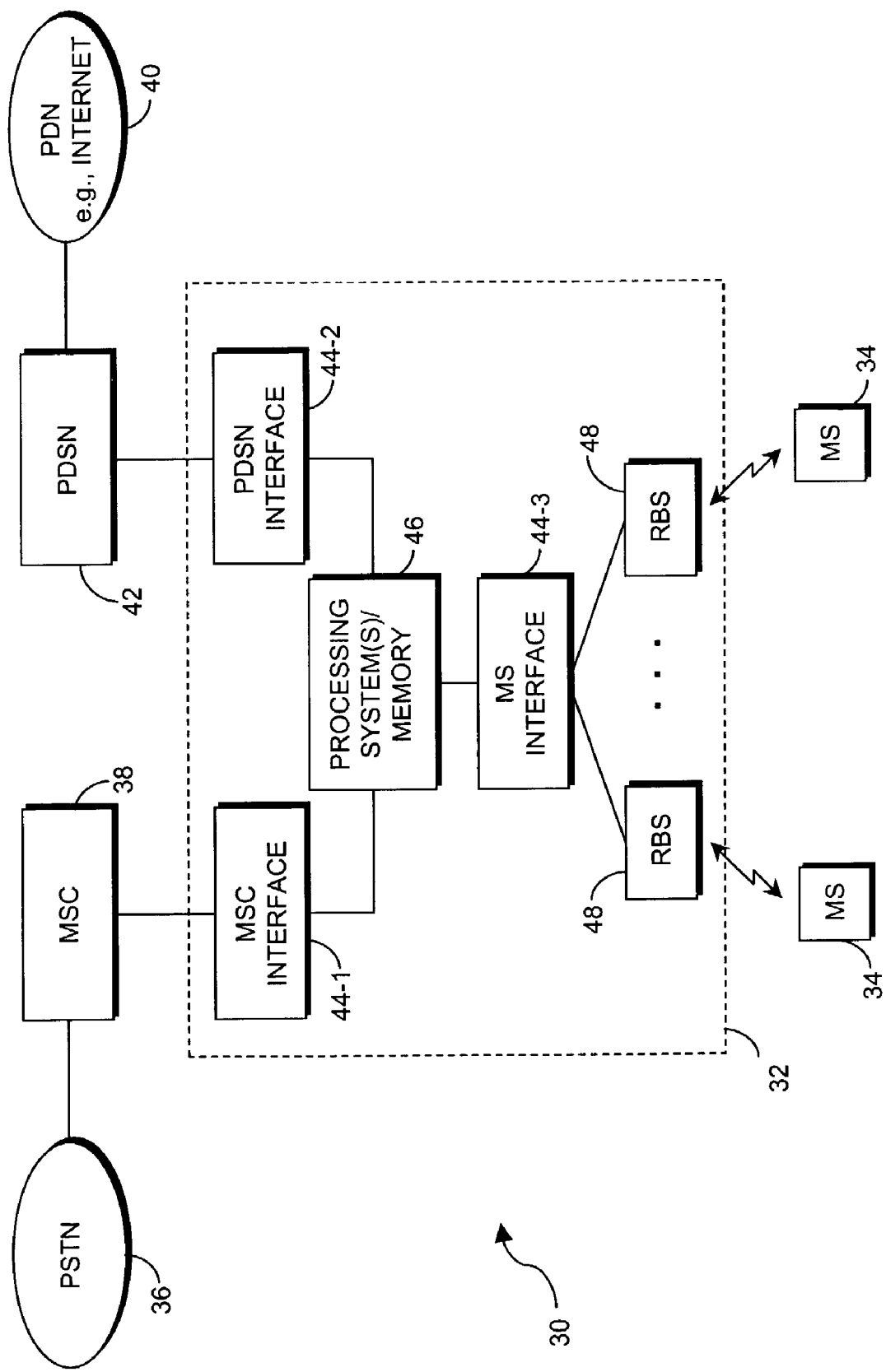
FIG. 8 is an exemplary diagram of a wireless communication network in which the dynamic token allocation adjustment may be advantageously used to match token allocations to actual traffic conditions.

FIG. 8 illustrates application of the present invention to communication traffic processing within an exemplary wireless communication network 30. Network 30 includes a Base Station System (BSS) 32 that communicatively couples one or more mobile stations 34 to the Public Switched Telephone Network (PSTN) 36 through a Mobile Switching Center (MSC) 38, and to one or more Packet Data Networks (PDNs) 40 through a Packet Data Serving Node (PDSN) 42. It should be noted that the support of circuit-switched and packet-switched communication traffic by network 30 is not necessary for practicing the present invention, nor is it necessary for realizing the full advantage of the present invention within wireless communication applications.

While the processing load control features of the present invention may be applied to essentially any processing entity, including a variety of network entities, this discussion focuses on illustrating its use within BSS 32. BSS 32 represents a vital processing entity within network 30, serving to interface the mobile stations 34 with a variety of other network elements, such as the MSC 38 and PDSN 42.

As such, the exemplary BSS 32 includes a number of "interfaces" 44 which communicatively couple it to various other network entities. Specifically, BSS 32 includes an MSC interface 44-1, a PDSN interface 44-2, and a mobile station interface 44-3. Those skilled in the art will appreciate that BSS 32 may include other interfaces not shown, such as an inter-BSS interface for managing call handoff of mobile stations 34 between different BSSs 32, and various other interfaces. Further, one should note that the simplified architecture of BSS 32 may not be representative of the actual physical processing and interface arrangements adopted by a particular BSS manufacturer.

Regardless of its implementation details, the various interfaces 44 of BSS 32 operate much like the processing event entry points 14 of the generic processing entity 10 introduced in FIG. 1. That is, each of the interfaces 44 represents a point of admission to the BSS 32 for work-producing processing events. In the context of BSS 32, such events might comprise, for example, a paging message from MSC 38 for a given one of the mobile stations 34 supported by BSS 32, call traffic and associated signaling messages received from mobile stations 34 through Radio Base Stations (RBSs) 48, or packet data traffic associated with PDSN 42.

Thus, the variety of processing event types in the context of BSS operations is considerable. One may refer to the various wireless network Interoperability Specifications (IOSs) for a better understanding of the various "A" and "UM" interface specifications. Since such information is not germane to understanding the present invention, further details regarding the possible types of processing events, e.g., signaling and traffic messages, are not explored.

As with the processing resources 12 of the generic processing entity 10, BSS 32 includes a processing system 46, which must be managed to ensure efficient utilization while still avoiding processing overload. Therefore, admission control must be employed at each of the interfaces 44 to ensure the number of work-producing events admitted to processing resources 46 at any given time does not exceed the BSS's processing capacity. Processing overload is particularly undesirable in BSS 32 as overloading its processing capacity would render it incapable of performing miscellaneous but important background "operations and maintenance" functions, and from responding to, for example, call origination messages initiated by the various mobile stations 34. To ensure reserve processing capacity, the discrete representation of the processing capacity associated with processing system 46 as N tokens preferably includes a de-rating factor such that the N tokens symbolize, e.g., 80% of available capacity.

Figure 10:
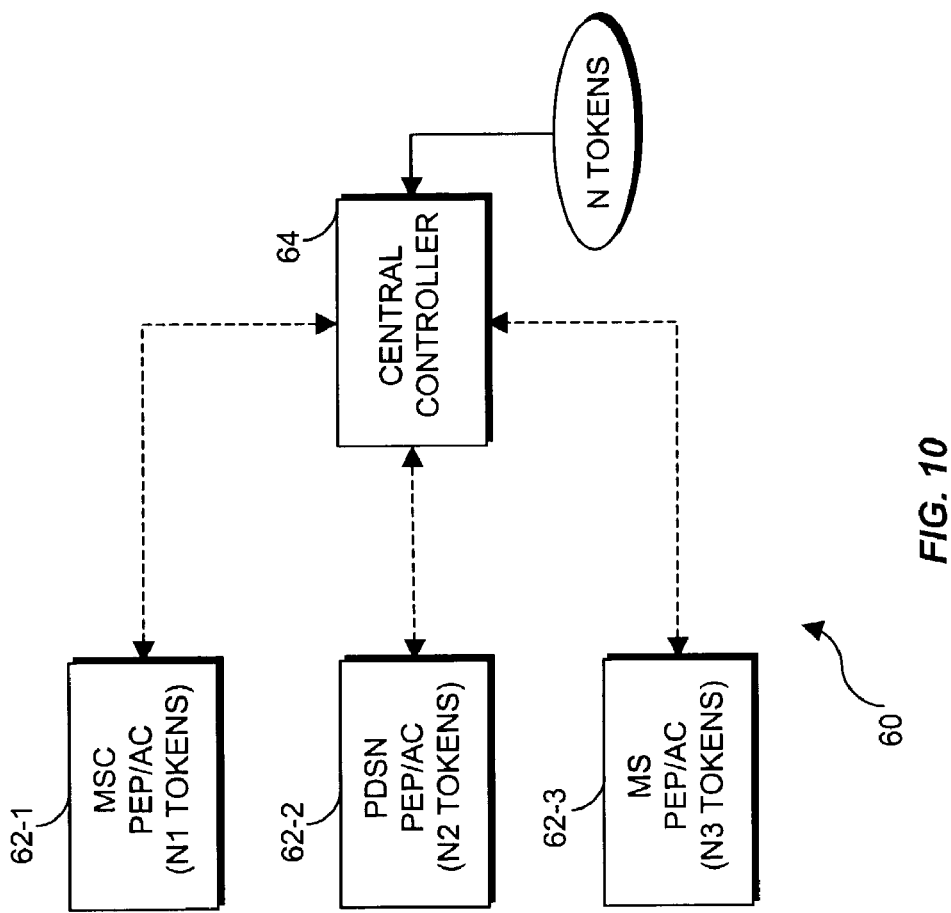
FIGS. 9 and 10 are exemplary diagrams of distributed (token ring) and centralized dynamic token allocation arrangements, respectively, as might be used within the network of FIG. 8.
Figure 9:
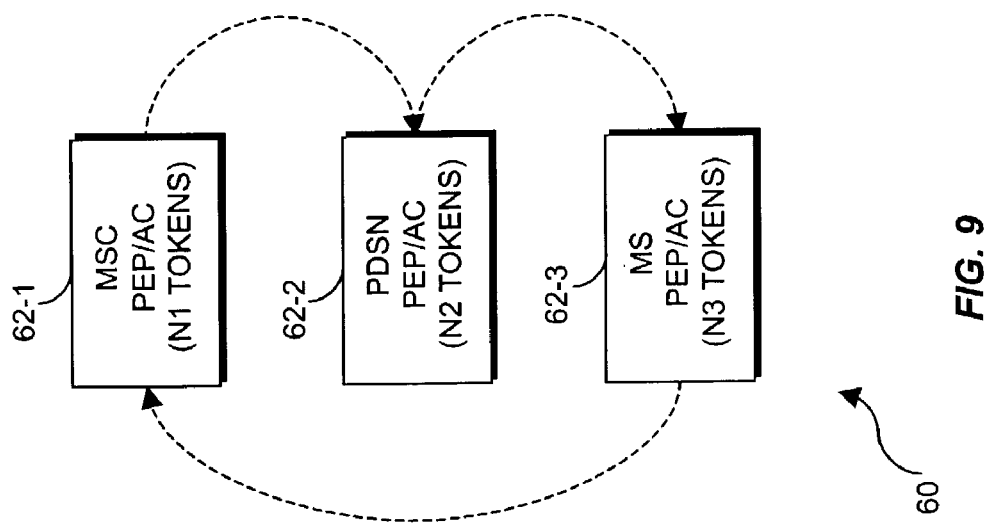

FIGS. 9 and 10 illustrate distributed (token ring) and centralized approaches to dynamically managing the allocation of these N tokens between the various interface 44 such that token allocation dynamically adjusts to match actual call traffic conditions. This dynamic approach to allocation management differs markedly from the conventional approach. For example, in the conventional approach, interface 44-3 might be assigned a fixed number N3 of the N tokens, while interface 44-1 would be assigned another fixed number N1 of the N tokens. As accepted call models predict a greater number of mobile-originated calls than mobile-terminated calls, one would expect that the mobile station interface 44-3 would be busier than MSC interface 44-1 in that a greater number of mobile-origination events is expected than mobile-termination events. If it turns out that actual traffic patterns differ such that the number of mobile-terminated calls exceeds the number of mobile-originated calls, then the fixed allocation of tokens (N1<N3) will leave interface 44-1 with too few tokens, even if interface 44-3 has tokens to spare.

To counter such inefficient utilization of BSS 32, FIG. 9 depicts a token ring 60 of access controllers 62, where access controller 62-1 acts as a throttler for interface 44-1, access controller 62-2 acts as a throttler for interface 44-2, and so on. Therefore, token ring 60 operates essentially like token ring 18 described earlier herein. Thus, access controllers 62 and the corresponding interfaces 44 perform the processing event admission control of access controllers 16 and processing event entry points 14 described in the context of token ring 18. As was noted earlier, the allocation of tokens between the various interfaces 44 may be dynamically adjusted to match actual call processing activity based on circulating token usage information message 20 around token ring 60.

Similarly, FIG. 10 illustrates an exemplary centralized approach to dynamic token allocation management within BSS 32, wherein a centralized controller 64 dynamically adjusts the various token allocations to the interfaces 44 at each admission cycle, in essentially the same manner as the previously described centralized controller 28. Note that with either the token ring or centralized approaches to dynamic token allocation management, the initializing token distribution may bias the allocation of tokens to each of the interfaces 44 based on presumed traffic behavior rather than on a simple N/M equal distribution.

Another point worth mentioning is that the present invention embodies simplified token usage reporting, and simplified re-allocation schemes. That is, the communication overhead for the token ring and centralized arrangements is minimal. In noting the value of such low communication overhead, it should be noted that the dynamic allocation processing provided by the present invention often consumes a certain amount of the processing capacity of the entity being managed. Thus, in FIGS. 9 and 10 for example, the access controllers 62 and/or the centralized controller 64 may be implemented as software functions supported by the processing system 46 despite being illustrated as separate from processing system 46. As such, dynamic token management operations preferably consume little processing power as possible.

While the above discussion provided specific examples and detailed exemplary implementations, it should be understood that the present invention provides dynamic token allocation management, which is applicable in a broad array of processing applications where the total processing load must be managed to avoid overload. As such, the present invention provides exemplary methods and systems for dynamically adjusting the token allocations used to manage processing event entry at the various processing entity entry points, such that utilization efficiency is maintained while still avoiding processing overload. Therefore, the present invention is not limited by the foregoing details, but rather by the scope of the following claims and the reasonable equivalents thereof.

What is claimed is:

1. A method of controlling processing load in a processing entity having two or more processing entry points, the method comprising:

representing a shared processing capacity as a plurality of discrete tokens;

allocating a share of the plurality of discrete tokens to each processing entry point;

admitting processing events at each processing entry point based on the availability of tokens allocated to that processing entry point; and adjusting the allocation of tokens among the processing entry points based on actual token usage at the processing entry points.

2. The method of claim 1, wherein adjusting the allocation of tokens among the processing entry points based on the usage of tokens at the processing entry points comprises increasing the share of tokens allocated to at least one processing entry point.

3. The method of claim 2, wherein adjusting the allocation of tokens among the processing entry points based on the usage of tokens at the processing entry points comprises decreasing the share of tokens allocated to at least one processing entry point.

4. The method of claim 1, wherein adjusting the allocation of tokens between the processing entry points based on actual token usage comprises:

defining an admission cycle; and adjusting the allocation of tokens among the processing entry points for a current admission cycle based on the actual usage by the processing entry points during a previous admission cycle.

5. The method of claim 4, wherein admitting processing events at each processing entry point based on the availability of tokens allocated to that processing entry point comprises admitting events at each entry point during the current admission cycle until the share of tokens allocated that entry point are exhausted.

6. The method of claim 5, wherein adjusting the allocation of tokens among the processing entry points for a current admission cycle based on the actual usage by the processing entry points during a previous admission cycle comprises increasing the token allocation for a selected processing entry point for a current admission cycle if the selected processing entry point exhausted its allocation of tokens during the previous admission cycle.

7. The method of claim 6, wherein adjusting the allocation of tokens among the processing entry points for a current admission cycle based on the actual usage by the processing entry points during a previous admission cycle further comprises reducing the token allocation for a selected processing entry point for a current admission cycle if the selected processing entry point had unused tokens during the previous admission cycle.

8. The method of claim 4, further comprising maintaining the total number of tokens at a predetermined quantity while adjusting the token share allocations for the processing entry points at each admission cycle.

9. The method of claim 1, wherein representing a shared processing capacity as a plurality of discrete tokens comprises equating a quantum of processing capacity to each token such that, collectively, the plurality of tokens represents the shared processing capacity.

10. The method of claim 1, wherein allocating a share of the tokens to each processing entry point comprises equally dividing the total number of tokens between the processing entry points such that each processing entry point is allocated an equal share of the plurality of tokens.

11. The method of claim 1, wherein adjusting the allocation of tokens among the processing entry points based on actual token usage at the processing entry points comprises:

evaluating token usage by all of the processing entry points at a central controller; and increasing or decreasing the share of tokens allocated to at least one processing entry point by said central controller.

12. The method of claim 11 further comprising transmitting token usage information from the processing entry points to the central controller and transmitting token allocation information from the central controller to the processing entry points.

13. The method of claim 1 wherein, adjusting the allocation of tokens among the processing entry points based on actual token usage at the processing entry points comprises determining, at each processing entry point, an increase or decrease in the share of tokens allocated to that processing entry point.

14. The method of claim 13 wherein determining an increase or decrease in the share of tokens at each processing entry point comprises:

receiving token usage information from at least one other processing entry point;

determining adjustments in the share of tokens allocated to that processing entry point based on said token usage at that processing entry point and said token usage information from said one other processing entry point.

15. The method of claim 14 further comprising successively relaying a token usage message containing said token usage information between said processing entry points.

16. The method of claim 15 further comprising arranging said processing entry points in a ring, said token message being passed serially between said processing entry points around said ring.

17. The method of claim 16, further comprising accumulating an unused token count within the token usage message as the token usage message is relayed around the ring.

18. The method of claim 17 further comprising increasing the unused token count at a processing entry point if said processing entry point has unused tokens.

19. The method of claim 18 further comprising decreasing said unused token count at a processing entry point if said processing entry point needs additional tokens.

20. The method of claim 19 further comprising defining a repeating admission cycle, said token allocation being adjusted in each token admission cycle.

21. The method of claim 20 further comprising selecting a processing entry point to serve as an anchor entry point to initiate and end the relay of said token message.

22. The method of claim 21 further comprising changing the anchor entry point during each admission cycle.

23. The method of claim 1 further comprising transmitting token usage information from said processing entry points to a central controller, said central controller adjusting allocations and transmitting token allocation information to said processing entry points.

24. The method of claim 23 wherein adjusting the allocation of tokens among the processing entry points based on actual token usage at the processing entry points comprises releasing tokens at a processing entry point that has unused tokens.

25. The method of claim 24 wherein adjusting the allocation of tokens among the processing entry points based on actual token usage at the processing entry points further comprises using tokens at a processing entry point released by another processing entry point.

26. A base station system comprising:

shared processing resources having a fixed processing capacity;

a plurality of processing entry points for accessing said processing resources;

a processor controller controlling use of said processing resources, said processor controller operative to:

represent said shared processing resources as a plurality of discrete tokens;

allocating a share of the plurality of discrete tokens to each processing entry point;

admit processing events at each processing entry point based on the availability of tokens allocated to that processing entry point; and adjust the allocation of tokens among the processing entry points based on actual token usage at the processing entry points.

27. The base station system of claim 26, wherein the processor controller adjusts the allocation of tokens among the processing entry points by increasing the share of tokens allocated to at least one processing entry point.

28. The base station system of claim 27, wherein the processor controller adjusts the allocation of tokens among the processing entry points comprises decreasing the share of tokens allocated to at least one processing entry point.

29. The base station system of claim 26, wherein the processor controller defines an admission cycle, and adjusts the allocation of tokens among the processing entry points for a current admission cycle based on the actual usage by the processing entry points during a previous admission cycle.

30. The base station system of claim 29, wherein the processor controller includes a plurality of access controllers, each disposed at a respective processing entry point to admit events at that entry point during the current admission cycle until the share of tokens allocated at that entry point are exhausted.

31. The base station system of claim 30, wherein the processor controller increases the token allocation for a selected processing entry point for a current admission cycle if the selected processing entry point exhausted its allocation of tokens during the previous admission cycle.

32. The base station system of claim 31, wherein the processor controller reduces the token allocation for a selected processing entry point for a current admission cycle if the selected processing entry point had unused tokens during the previous admission cycle.

33. The base station system of claim 29, further comprising maintaining the total number of tokens at a predetermined quantity while adjusting the token share allocations for the processing entry points at each admission cycle.

34. The base station system of claim 26, wherein the processor controller represents a shared processing capacity as a plurality of discrete tokens by equating a quantum of processing capacity to each token such that, collectively, the plurality of tokens represents the shared processing capacity.

35. The base station system of claim 26, wherein the processor controller initially allocates an equal share of tokens to the processing entry points.

36. The base station system of claim 26, wherein the processor controller includes a central controller connected to each of the processing entry points.

37. The base station system of claim 36 wherein the processing entry points transmit token usage information to the central controller, and wherein the central controller adjusts the token allocation for each processing entry point and transmits token allocation information to the processing entry points.

38. The base station system of claim 26, wherein the processor controller includes a plurality of access controllers, each disposed at a respective processing entry point, to admit events at that entry point.

39. The base station system of claim 38 wherein said access controllers are connected in series and wherein said access controllers successively relay a token usage message containing said token usage information between said processing entry points.

40. The base station system of claim 39 wherein said access controllers are arranged in a ring.

41. The base station system of claim 40, wherein said token usage message includes an accumulated an unused token count as the token usage message is relayed around the ring.

42. The base station system of claim 41, wherein the access controller at a processing entry point increases the unused token count if the corresponding processing entry point has unused tokens.

43. The base station system of claim 42 wherein the access controller at a processing entry point decreases the unused token count if the corresponding processing entry point needs additional tokens.

44. The base station system of claim 43 the processor controller defines a repeating admission cycle, and wherein the processor controller adjusts the token allocation during each admission cycle.

45. The base station system of claim 44 wherein a selected access controller starts and ends the relay of the token message during each admission cycle.

46. The base station system of claim 45 wherein the selected access controller changes after each admission cycle.

* * * * *

UNITED STATES PATENT AND TRADEMARK OFFICE
CERTIFICATE OF CORRECTION

PATENT NO. : 7,330,480 B2  
APPLICATION NO. : 10/227742  
DATED : February 12, 2008  
INVENTOR(S) : Khan et al.

It is certified that error appears in the above-identified patent and that said Letters Patent is hereby corrected as shown below:

Column 16, Line 38, in Claim 44, after "claim 43" insert -- wherein --.

Signed and Sealed this

Seventh Day of October, 2008

JON W. DUDAS  
*Director of the United States Patent and Trademark Office*